United States Patent
Kazda et al.

(10) Patent No.: US 7,581,201 B2
(45) Date of Patent: Aug. 25, 2009

(54) SYSTEM AND METHOD FOR SIGN-OFF TIMING CLOSURE OF A VLSI CHIP

(75) Inventors: Michael A. Kazda, Poughkeepsie, NY (US); Pooja M. Kotecha, Wappingers Falls, NY (US); Adam P. Matheny, Beacon, NY (US); Lakshmi Reddy, Briarcliff Manor, NY (US); Louise H. Trevillyan, Katonah, NY (US); Paul G. Villarrubia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 11/680,110

(22) Filed: Feb. 28, 2007

(65) Prior Publication Data

US 2008/0209376 A1   Aug. 28, 2008

(51) Int. Cl.
*G06F 17/50* (2006.01)

(52) U.S. Cl. ............ 716/6; 716/4; 716/9; 716/12; 716/18

(58) Field of Classification Search .......... 716/4, 716/6, 9, 12, 18
See application file for complete search history.

(56) References Cited

U.S. PATENT DOCUMENTS

| | | | |
|---|---|---|---|
| 5,508,937 A | 4/1996 | Abato et al. | |
| 6,175,947 B1 | 1/2001 | Ponnapalli et al. | |
| 7,036,104 B1 | 4/2006 | Alpert et al. | |
| 7,111,260 B2 | 9/2006 | Visweswariah | |
| 2005/0066297 A1 | 3/2005 | Kalafala et al. | |
| 2005/0251775 A1 | 11/2005 | Wood | |
| 2008/0216038 A1* | 9/2008 | Bose | 716/8 |

OTHER PUBLICATIONS

U.S. Appl. No. 11/420,529, to Gregory M. Schaeffer et al., entitled, "Method for a Fast Incremental Calculation of the Impact of a Coupled Noise on Timing", filed May 26, 2006.

* cited by examiner

*Primary Examiner*—Thuan Do
(74) *Attorney, Agent, or Firm*—H. Daniel Schnurmann

(57) ABSTRACT

A method for performing timing optimization of a detail routed netlist, incorporating statistical variability information, common path pessimism reduction, and capacitative coupling information, in a tightly coupled, incremental manner with minimal perturbations to the placement, routing, and asserted parasitic information. The method corrects violations in a placed and routed design of a VLSI circuit chip, where the design is represented by a netlist describing logical and physical characteristics of the design and by a corresponding timing graph, the method including the steps of: identifying violations in the design; iteratively eliminating the violations by incrementally transforming the logical and the physical characteristics of the design, incorporating in the design only legal placements and routes; and applying incremental timing to evaluate the transformations, and updating the existing timing graphs to reflect changes consisting of the legal placements and routes.

19 Claims, 7 Drawing Sheets

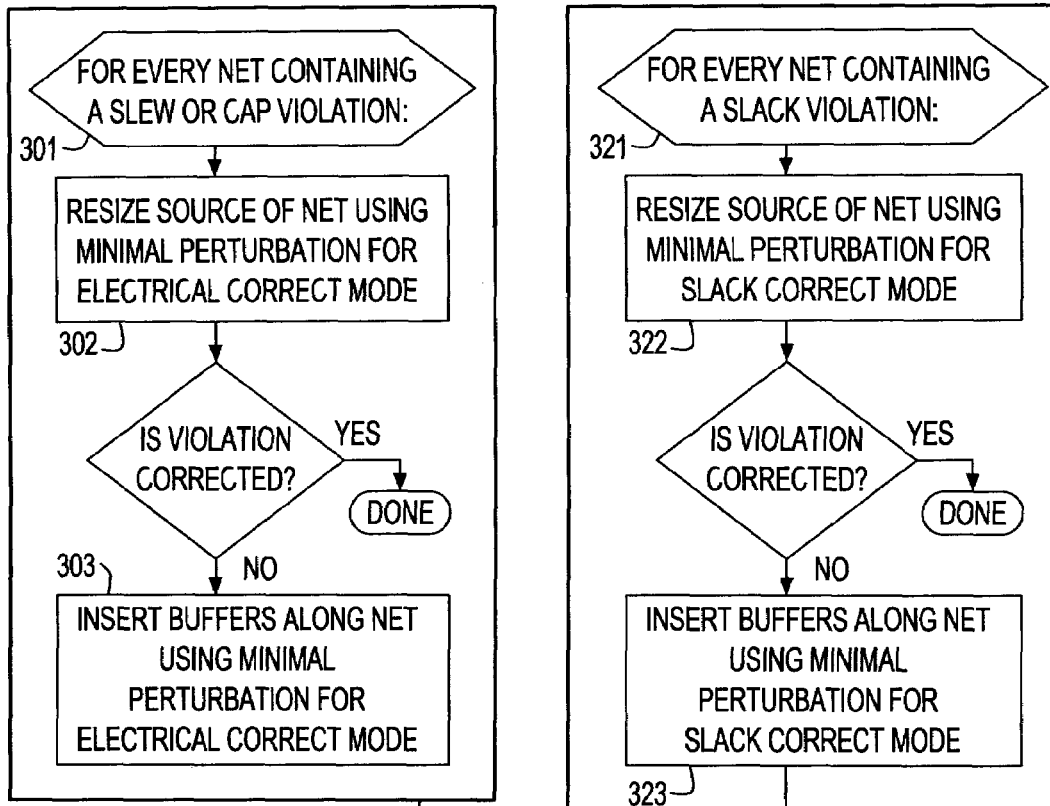
FIG. 3
FIG. 4
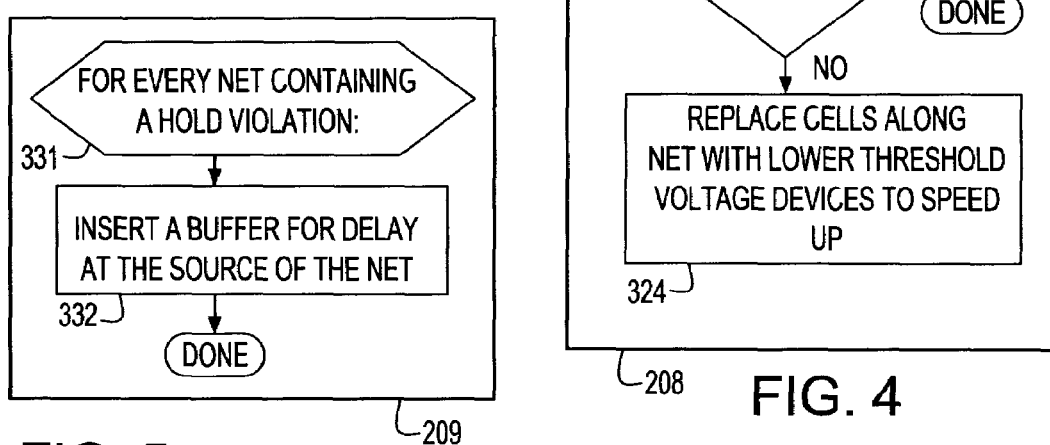
FIG. 5

FIG. 9a
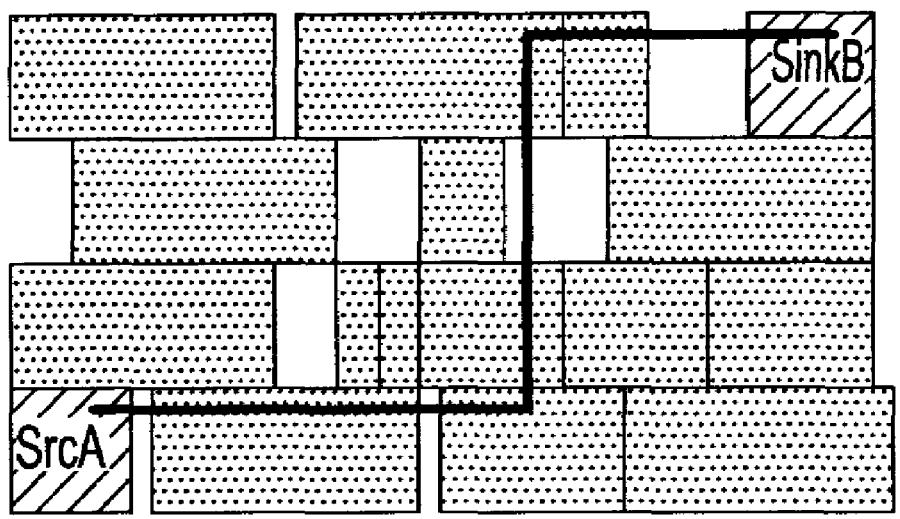
INSERT BUFFER ALONG ROUTE WITH MINIMAL DISTURBANCE
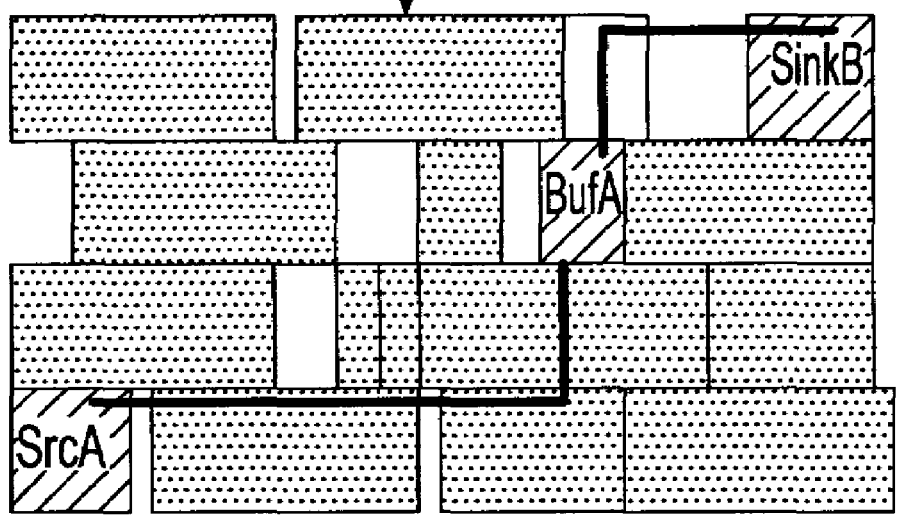
FIG. 9b

SYSTEM AND METHOD FOR SIGN-OFF TIMING CLOSURE OF A VLSI CHIP

FIELD OF THE INVENTION

The present invention is related to the design of Very Large Scale Integrated (VLSI) circuits, and more particularly, to a system and method for signing-off timing closure that guarantees the functionality and performance of a VLSI chip.

DESCRIPTION OF THE PRIOR ART

The trend of VLSI technologies has caused a marked increase in the amount of time it takes to close on-chip timing due to the increased need for accurate timing information to make optimization decisions and increasing feature sizes of chips. Parasitic extraction, capacitive coupling, and variability often cause perturbations that necessitate determining the exact capacitive and resistance effects of each layer for routes along interconnects in a netlist in order to provide a converging timing closure process.

Today's process is manual in nature and does not provide an efficient feedback to the decision making, thereby creating new problems such as generating wiring congestion, overpowering the design, all of which make timing closure convergence a time-consuming and difficult problem.

The conventional process for improving timing on a post-routed VLSI chip incorporates information from extraction, coupling and variation analysis. Parasitic extraction and coupling data information are asserted on a timing mode which is setup to incorporate variation analysis. Timing reports of end point paths are then generated, wherein a designer examines the timing end-point reports that account for these effects and attempts to fix those that miss their timing. For each path, the designer selects a solution to the failing path at hand, such as powering upwards a book to speed a path, inserting a buffer to drive a longer wire, off-loading non-critical sinks, inserting a wider wire to reduce capacitance and speed, changing a gate to a lower voltage to improve path performance, and the like. This is accomplished outside of the timed environment by writing engineering-change orders (ECOs) that are a text representation of netlist changes. ECOs are applied to the netlist and are legally placed using a manual or script driven means. The wires which were identified are then removed and rewired. After rerouting the design, parasitic extraction is performed on the wires to determine the resistances and capacitances. The design is retimed with the new netlist changes accounting for capacitive coupling effects (based on proximity of the nets), and a new timing reports are generated to identify how many "misses" remain to be fixed. The process is then repeated.

The conventional process described above suffers from severe drawbacks in that the present methodology fails to accurately correlate the timed logic representation of the design to the physical characteristics of the design.

The conventional process further suffers from the drawbacks related to the manual timing optimization failing to make decisions with the exact variation and parasitic effects that are the cause of iterations. These problems include:

Placement of circuits done without knowledge of the timing, and which often are the cause of degraded timing to the placement process in regions of congested wiring.

Capacitive coupling effects that do not become known until after the routing has been completed which, in turn, does not guarantee fixing the problem nor is capable of introducing a new timing miss due to coupling effects.

Variation effects (metallization, negative bias temperature instability, and the like) that become evident late in the process, in instances where netlist changes do not guarantee to entirely solve the problem without having some of this information fed back into the decision making process. Obviously, optimization would be much more effective if more information related to the cause of a problem were available.

Additionally, the above described methodology presents an added problem in that it is a manually intensive operation to correct designs in this fashion. One pass of the current process typically takes 2-3 days for a 5.5 million net design which causes a lengthy timing closure cycle. Quite often, the corrections fluctuate and require multiple passes.

The existing art describing the process for implementing changes based on post-routed, netlist data will now be explained in more detail with reference to FIG. 1.

The timing environment at this late stage of the design flow is called "sign-off" timing. "Sign-off" timing analysis can be defined as an environment covering an n-dimensional space which models the effective timing of a manufactured chip. It is a checkpoint that has to be met in order for a design to be manufactured. It accounts for several global and local variables that model the chip. These can be described by several factors:

Manufacturing: i) Front-end-of-line: layers that define the active transistors show variation in the transistor's electrical characteristics. Physical quantities such as the length of the gate, depth of the semiconductor junction or thickness of the oxide cannot be perfectly controlled during manufacturing and hence show variations, which lead to fluctuations in the behavior of the transistors. ii) Back-end-of-line: consists of the metal interconnect layers. For example, thickness, width and inter-layer dielectric thickness of each metal layer are sources of variability. These, in turn, cause the wires to change their delay, and in fact these sources of variability can change the delay of gates that drive them and gates which are driven by them.

Fatigue (NBTI, hot electron effect): After a long period of use in the field, transistor characteristics change due to these physical phenomena, leading to changes in the delay of the circuit components.

Environmental (voltage, temperature);

Circuit design (PLL jitter, coupling noise, Silicon-on-Insulator history);

Across-chip (OCV/ACLV, temperature, voltage); and

Model-to-hardware correlation.

Variation effects on timing can be modeled statistically as described in U.S. Pat. No. 7,111,260 to Visweswariah, of common assignee, and in a paper entitled "First-order incremental block-based statistical timing analysis", by C. Visweswariah, K. Ravindran, K. Kalafala, S. G. Walker, and S. Narayan, published in the *Design Automation Conference* (*DAC*), San Diego, Calif., pages 331-336, June 2004.

The following information is fed into sign-off timing analysis (step 104) and reports are generated about the state of the design, a) the placed and routed netlist (100), b) the design constraints (101), describing the arrival times and required arrival times of signals, c) the technology library description (102) of logical, physical, and timing characteristics of each leaf-level element, and d) 3D extraction data (such as SPICE) (103).

If the chip meets its timing goals, then there is no work to be performed. However, if there are paths not meeting their timing goals, in step 105, the designer examines the timing end point reports that account for capacitive coupling and variability effects and attempts to repair those that miss their timing. For each path, the designer selects a solution to the failing path at hand, using one or more of the following techniques:

The designer writes engineering-change orders (ECOs) (step 111), which are a text representation of netlist changes. A manual inspection (105) by the designer typically consists of the following steps:

Step 106: examine the end point report path for a large transition time, and increase the drive strength of the driving cell to speed up a path, Step 107: examine the end point report path for a large capacitance violation that exceeds limits and increase the drive strength of the driving cell to correct the violation Step 108: search for books that appear to be underpowered and increase their sizes to improve timing along the path.

Step 109: look for long paths based on physical location of sources and sinks which have a large delay and insert buffers or inverters to repeat the signal and reduce the delay along the path.

Step 110: if critical cells are present, change the cell to a lower threshold voltage representation to improve the path performance.

In step 112: ECOs are applied to the netlist which are then legally placed by way of manual or script driven means, the wires which have been touched are removed and rewired.

After rerouting the design (step 113), parasitic extraction (step 114) is again performed on the wires to obtain new resistances and capacitances.

Step 104 is repeated and the design is retimed with the new netlist changes and parasitic effects. During this process, effects for capacitive coupling are accounted for (based on proximity of the nets). A series of new timing reports are generated, which describes how many "misses" remain to be fixed, and the process is repeated until the all paths can be closed on timing.

The above process is repeated until the design can meet its timing goals. In summary, the conventional process for improving timing in a post-routed VLSI chip is a manually intensive operation involving routing, extraction, coupling, and variation-aware timing information in a netlist placed and routed, as described in steps 105 through 114 above. The current process fails to focus on the post-placed and post-routed representation of the data in order to close on-chip timing.

Therefore, there is a need in the industry for a methodology that is capable of merging the timed logic representation of the design to the physical aspect of this design. Moreover, there is a further need to achieve the stated goal with a methodology that simultaneously accounts for eliminating electrical and timing violations in an automated process by transforming failing circuits and interconnect wires with only legal placement and their associated routing. Given this trend, optimization techniques need to target the sign-off timing criteria for variability.

OBJECTS AND SUMMARY OF THE INVENTION

Accordingly, it is an object of this invention to provide a system and method to efficiently improve the timing and electrical violations in the design of VLSI chips, given placed and routed data.

It is another object to provide minimal placement and routing disruptions in a VLSI chip during optimization.

It is still another object to provide a system and method for making changes that will correct for coupling noise, utilizing integrated coupling analysis.

It is yet a further object to reduce variability effects through the use of statistical timing information during optimization.

These and other objects of the invention are provided by a system and a method to integrate physical, timing, routing, extraction, coupling, and variation information into the optimization process to solve timing misses with a high-degree of accuracy and confidence and for incrementally solving the violations impacted by coupling noise and variability on the timing of an integrated circuit chips.

In one aspect of the present invention, the invention minimizes placement and routing (i.e., wiring) disruptions to the netlist and the inclusion of variability of information, utilizing statistical timing sensitivities to avoid and correct for variation effects and satisfy the constraints of an integrated post-routing optimization for design closure.

In another aspect of the invention, there is provided a method for correcting violations in a placed and routed design of a Very Large Scale Integrated (VLSI) circuit chip, the design being represented by a netlist describing logical and physical characteristics of the design and by a corresponding timing graph, the method including the steps of:

identifying violations in the design;

iteratively eliminating the violations by incrementally transforming the logical and the physical characteristics of the design, incorporating in the design only legal placements and routes; and applying incremental timing to evaluate the transformations, and updating the existing timing graphs to reflect changes consisting of the legal placements and routes.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

FIG. 3 describes the process of correcting electrical violations.

FIG. 4 describes the process of correcting late mode timing violations.

FIG. 5 describes the process of correcting early mode timing violations.

FIG. 9 illustrates an example of inserting a buffer with minimal perturbation in a minimal placement and routing.

DETAILED DESCRIPTION OF THE INVENTION

The present invention and the various features and aspects thereof are explained more fully with reference to non-limiting embodiments that are illustrated in the accompanying drawings and detailed in the following description.

In the description hereinafter described, the following definition of terms will be used.

Late mode—establishes the longest delay, or critical path, which sets the maximum speed at which the VLSI chip can run.

Early mode—determines the conditions that are necessary for a correct operation of the chip when fast paths resulting from signals arriving before expected are found to exist.

Transition time—defines the time it takes for a signal waveform to travel from 10% to 90% of its final value. It is also referred to as slew time.

Legal placement—defines a condition where every circuit of the design is placed according to placement rules and constraints. A circuit must be placed such that its occupying area does not overlap that of other circuits. In addition, circuits must adhere to specified orientations as defined by the placement rules, e.g., to attach to power and ground routing. A circuit may have to be placed such that the origin is "flipped" to the upper left instead of being at the lower left.

Legal wires—for wires to be considered legal, they must satisfy certain groundrules for a technology, such as minimum spacing, minimum width, etc. Two wires on the same layer of metal cannot occupy the same space. This could be construed as a 'short' and would not be legal.

Figure 1:
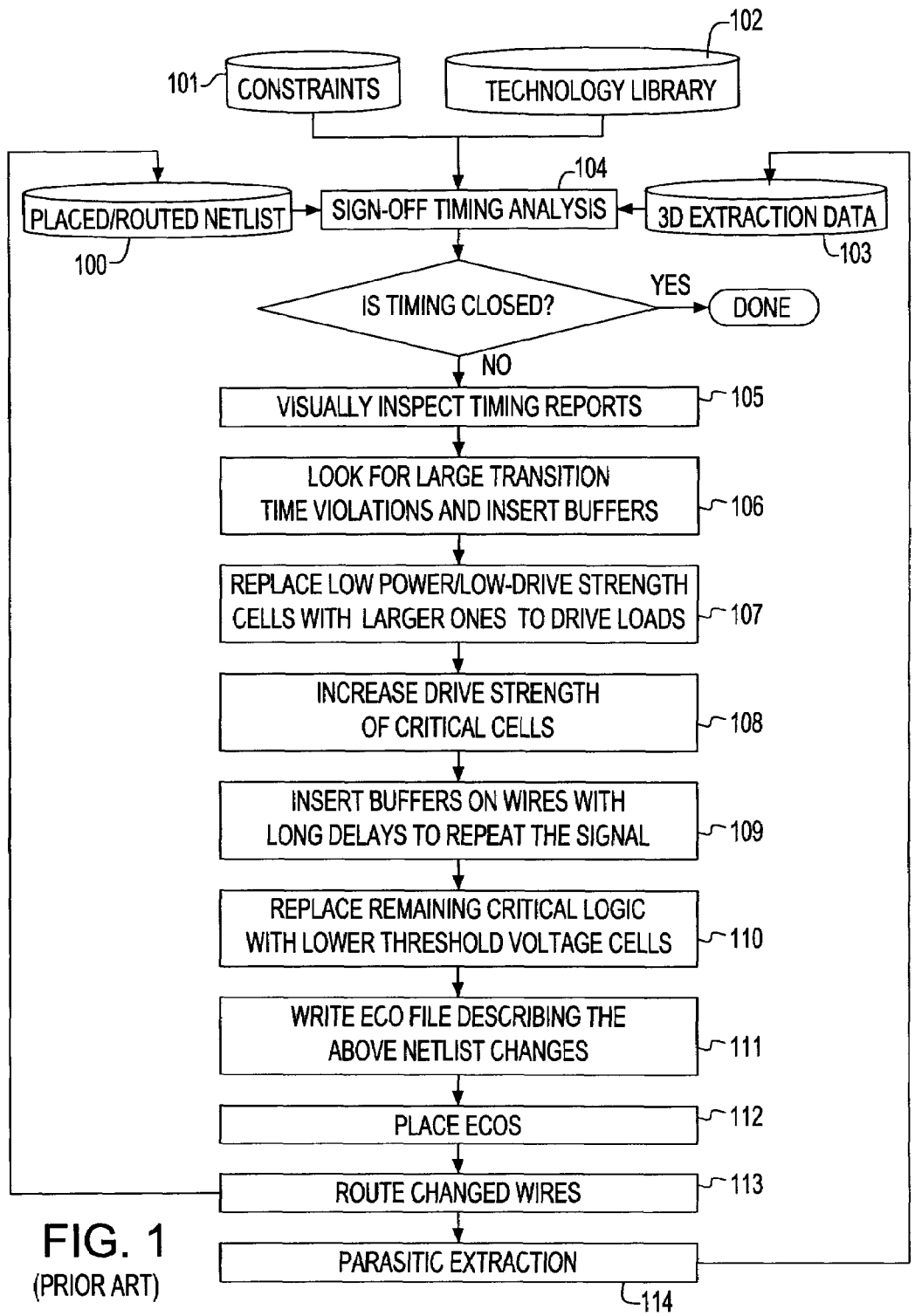
FIG. 1 illustrates prior art for completing the timing closure of VLSI chip with emphasis on the post-detail routing fix. It focuses on how conventional ECOs are typically designed after studying timing reports.
Figure 2:
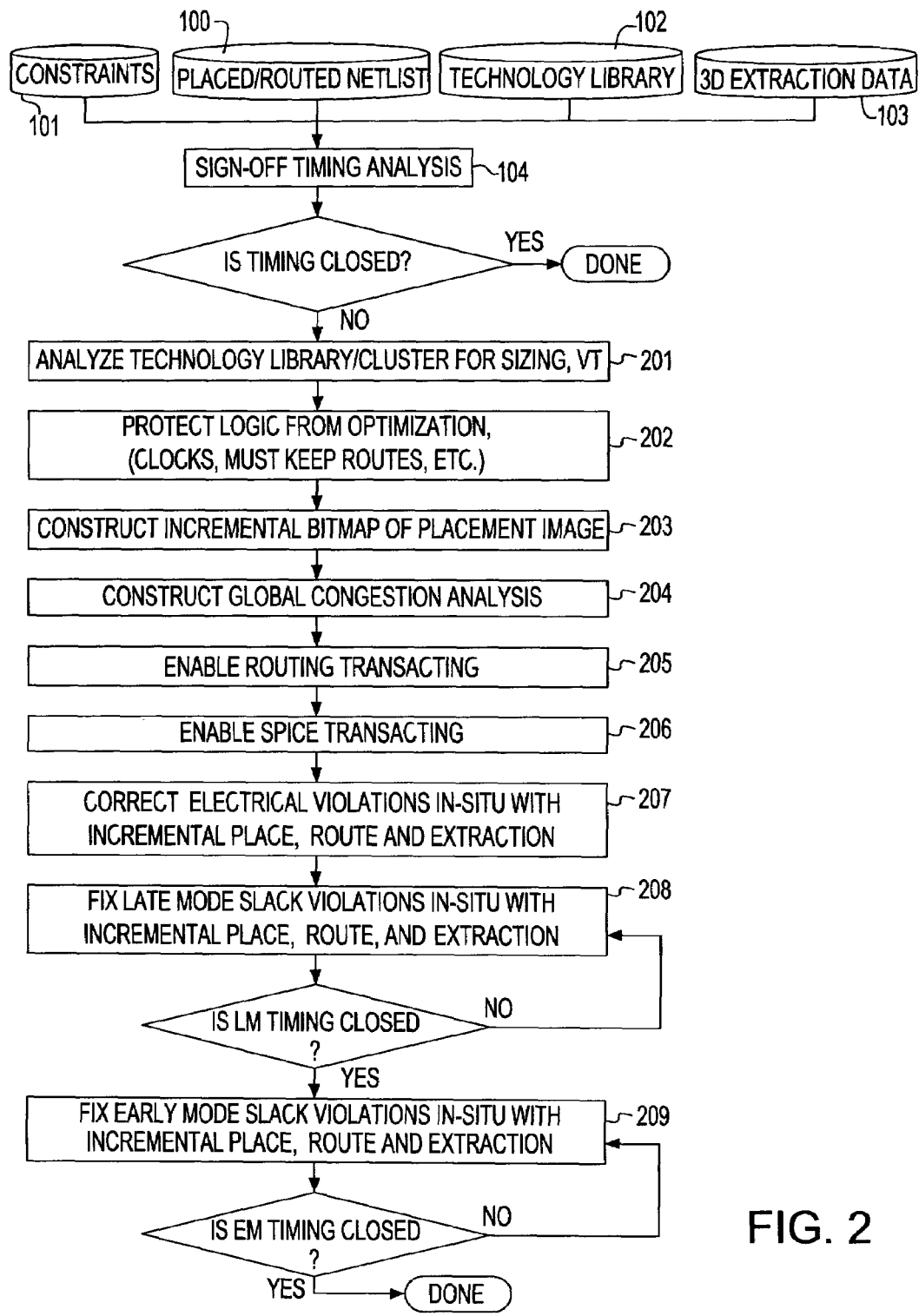
FIG. 2 is a high level flowchart according to the present invention, wherein local timing optimizations with incremental placement, routing and extraction providing a tight feedback look into the routing, coupling and variability information are incorporated.

Referring to FIG. 2, a high level flowchart according to the present invention is shown, wherein local timing optimizations along with incremental placement, incremental routing and incremental extraction are fed back into the routing, coupling and variability information.

The process for setting up the environment and solving timing problems is described. The placed and routed netlist (100), the constraints describing the required timing conditions (101), the technology library with variability information (102), and 3D extraction data (103) are inputted into the algorithm.

The invention builds upon the framework of incremental timing, as described in commonly assigned U.S. Pat. No. 5,508,937 to Abato et al., which is augmented with local optimizations performed with a simultaneous incremental placement, incremental routing, and incremental extraction, through the use of a tightly coupled, callback-mechanism to convey logical and physical changes of the netlist. The callback mechanism is defined when one or more user defined functions are called when certain changes are performed. By way of example, if a pin is disconnected from a net and reconnected, the routing and extraction information becomes invalidated, and the incremental routing and extraction engines each receive a callback function to update their data structures. When a query is initiated for timing, the incremental timing engine fetches the extraction that needs to be computed. The extraction requires having an RLC tree, which, in turn causes the incremental routing to be performed on the net that was reconnected. Integrating this feature in the present method provides a converging timing solution to the chip design.

A sign-off timing analysis environment is initially setup in step 104. In order to model variability, timing is initialized preferably using statistical timing probabilistic distribution functions documented in commonly assigned U.S. Pat. No. 7,111,260 to Viswesariah. This sign-off timing analysis environment preferably includes initialization of the incremental coupling engine as described in commonly assigned U.S. patent application Ser. No. 11/420,529.

When statistical timing information is employed, the critical path is not unique. During manufacturing, some parts of metals on the chip are thicker than other parts of the chip; depending on what process parameters the chip is manufactured. Usually, thicker metals are more capacitively loaded, hence delay of paths through these thicker metals are likely longer than paths not. Because of this, among all manufactured chips, different paths may become critical depending on which parts of metals in the chip get thicker. In other words, different paths become critical in different process spaces. Thus, each path has some probability of being critical, corresponding to the probability of the process landing in a region of the process space dominated by that path. The same holds true for timing points and edges of the timing graph.

Criticality analysis is an efficient way to predict the probability of a node or edge being on the MOST critical path. A cut-set method is used to compute criticality, while correctly considering correlations is described in the paper entitled "Criticality computation in parameterized statistical timing", by J. Xiong, V. Zolotov, C. Visweswariah, and N. Venkateswaran, Design Automation Conference (DAC), San Francisco, Calif., July 2006. Criticality analysis for the entire graph can be advantageously performed in linear time, since it only takes a small fraction of CPU running time.

The invention may be advantageously used with either deterministic or statistical timing analysis. When deterministic timing is employed, a standard worst-case analysis is performed. Statistical timing, however, provides additional information related to the causes of poor timing (i.e., sources of variation). In particular, it also provides sensitivities and criticalities. Sensitivities are indicative of a particular object (cell or wire) having a positive or negative effect as a result of a particular source of variation. For example, a library cell may be "sensitive" to the mistracking of n-type and p-type FET transistors. Criticalities relate to the probability that an object is on the most critical path of the design.

When optimizing the chip timing, it is necessary to define a "critical region" whereupon optimization is to be performed. The critical region consists of a set of objects predicted to miss their timing targets. Since correcting timing generally uses some other chip resource (e.g., area), optimization normally proceeds from the most to the least critical object. In deterministic timing, judgment is made solely on the basis of slack. In statistical timing, criticalities are used to modify the order in which optimization is performed. Supposing, for instance, that a particular pin has a predicted slack of −1 ns and a probability of criticality of 0.9. Another pin may have a slack of −2 ns but a criticality probability of 0.01, in which case, it is desirable to give priority to the first pin even though the statistical slack of the second pin is worse, since it is less likely to be more critical than the first. This is achieved by weighting critical objects by some function of slack and criticality, e.g., the product of the two.

Sensitivities are also used for altering the selection and ordering the critical region for optimization. Sensitivities at timing endpoints (primary outputs, latch inputs, and the like) are indicative of a potential timing problem not reflected in the slack. An endpoint having a significant positive slack has further the potential of performing badly under certain conditions which are encapsulated in the sensitivity of a particular source of variation. For example, an endpoint with a slack of +100 ps and a high sensitivity to metal mistrack may cause an alarm under certain operating conditions. When this occurs, it may be prudent to subject it to some optimization that guarantees the chip robustness. Thus, the endpoint may be considered part of the critical region for optimization, even if it is not chosen based on slack alone.

Once the critical region has been selected, normal optimizations as will be detailed hereinafter are performed. No special consideration is given to statistical considerations (e.g., sensitivities or criticalities) since speeding the logic anywhere along the critical path has the desired effect of improving the criticality or putting the slack into a safe range where sensitivity no longer poses a problem.

Still referring to FIG. 2, in step 201, the existing technology library 102 is characterized, and is ordered according to clusters of similar logic family but of varying drive strengths.

In step 202, a variety of cells within the netlist is protected from being optimized to prevent damage to the timing environment. For example, a flag may be placed on the logic containing the clock tree to prevent it from being optimized, because the designer may have carefully tuned it at a particular stage now requiring correction of the data-path elements. The clock tree is considered a constant in certain instances. The designer can also annotate information to prevent specific routes from being optimized, known as 'must keep routes'. Logic feeding the 'must keep route' is retained to prevent removal of these nets. Only optimizations that do not disturb the location of a route are employed. A variety of other protections are to be performed to prevent certain cells from being optimized.

Referring to step 203, to minimize disturbances in the placement, a bit map of the placement image is implemented, basically one where a cell occupies a slot in the image (and 0 when left unoccupied). Future transformations (steps 207, 208, and 209) supply a displacement number that will return a list of locations where the object can "fit" into the unoccupied space and which is looked up in the bit map. The displacement is a circle surrounding the origin of the circuit to be modified. For example, when a circuit is resized, if there is not enough space to the right or left, then one searches the circle surrounding the original location and finding the closest location that allows resizing the change to occur. Pre-existing placed cells are not moved or disturbed by the present method which leads to stability and convergence, while placing the new cell legally. The resize change is not accepted until timing is queried given the new placement location. Incremental timing recomputation is preferably performed using the method described in U.S. Pat. No. 5,508,937 issued to Abato et al. If it corrects the problem, it is accepted; otherwise it is discarded. The placement image is minimally altered when using this method.

In the prior art, typically, the process makes a change and then performs a separate step of legalizing in order to place changes occurring in the netlist. This adversely impacts or undoes (at least partially) the benefit provided by earlier optimizations, leading to non-converging iterations of placement and optimization. The invention provides for placement legality by construction, with no need for an extra separate legalization step. This significantly reduces the probability for subsequent iterations.

In step 204, the global congestion using a global router is analyzed. This information guides where new routes are to be placed to avoid wiring congested regions. A global router partitions the design into a set of regions, also known as gcells, determines rough routes for each net through the gcells. The edges of the gcells have a maximum amount of capacity based on layers of metal allowed by the physical technology. The edges of the gcells also contain the actual amount of resources that are assigned from which congestion crossing the edges are to be used for placement and routing operations. To perform global routing, the design is required to be fully placed.

In the inventive method, transactioning is used for routing and SPICE data. Steps 205 and 206 enable each of these types of transactioning infrastructures. The concept of transactioning is that important changes to the design are logged so that the design can be restored to the original state if changes are rejected. In this case, optimizations have three programming interfaces to use for transactioning: begin, undo and commit. When a potential optimization is initiated, the optimization program invokes "begin". This allows underlying programs to start logging selected design changes through callbacks on the programming interfaces for the in-core model of the design. For example, when a cell in the design is moved, the program that handles movement is asked to invoke a specific program (i.e., a callback program) either before or after the move is made. The program then logs whatever information is needed to allow it to restore the state if the change is withdrawn.

After a sequence of changes are made and evaluated, the optimization program calls either "commit" or "undo". A "commit" call is invoked when changes are accepted, causing the queues used for logging to be purged, while an "undo" causes the data saved in the logs to be refreshed, restoring the design to its original state with respect to whatever data was logged. When the routing transactions are committed, the congestion map is updated incrementally with the new routing demand.

When routing transactioning is active, there are callbacks on the design changes that affect the routing, such as a placement change or connection or disconnection of a pin. The callback program stores the existing routes on the pins that were altered. A placement change alters all the pins on the cell being moved. If "commit" is invoked, then the saved routes are deleted. If "undo" is invoked, the routes are restored to their saved state. When routing, it is possible that some wires that were not directly changed by the optimization program may be altered due to rip-up during incremental routing. These routes are also saved.

The processing for SPICE transactioning is similar to that of routing transactioning. SPICE data is read, pre-computed, and posted to the in-core model of the design. Changes affecting SPICE data, such as placement changes, or pin connect or disconnects have callbacks that save SPICE data for any net or pin modified during design changes. For the "undo", SPICE data is reposted to the nets and pins, and for a "commit", the logged SPICE data is deleted.

The reasons for transactioning are stability and performance. In the case of SPICE data, recreating the original data by recomputing is prohibitively expensive, so transactioning allows as much data as possible to be saved without recomputing. In the routing domain, performance is also improved, but the real purpose is to make sure that the state of the design is faithfully restored. Rerouting rather than transactioning does not guarantee that the route is restored to its original state, since the router selects different choices during a reroute.

The remaining steps 207, 208 and 209 of optimization alter the netlist utilizing the incremental timing, incremental placement bitmap, and incremental routing as defined above using SPICE and routing transactioning.

In step 207, detailed in FIG. 3, an embodiment of the invention performs electrical correction of capacitance and transition time (slew) violations to "center" the design based on rule violations and allow it to be efficiently optimized for late and early mode correction. In step 301, all the nets within the design having either a capacitance or transition time violation are processed. Given a net in step 302, its source of preferably resized until the power level corrects or reduces the violation. If the violation cannot be corrected, a buffer or inverter is inserted (step 303) in the net to correct the violation. Buffering is advntageously performed as described in U.S. Pat. No. 7,036,104 to Alpert et al.

Referring now to FIG. 4, in step 208, a late mode timing correction is performed to solve setup time test failures. Ordered by timing criticality, each net containing a slack violation is processed to be followed by optimization intended to fix the violation (step 321). In step 322, the source of the net is resized using the minimal perturbation method previously described, and evaluating the slack. If the violation no longer exists, the program terminates. Otherwise, in step 323, buffers or inverters are inserted to correct the slack violation using the aforementioned minimal perturbation method. Buffering is preferably done as described in U.S. Pat. No. 7,036,104 to Alpert, et al. If the violation is no longer present, the program terminates. Otherwise, in step 324, cells along that path with lower threshold voltage representations are replaced to speed the path.

The final step of FIG. 2 (step 209) consists of correcting early mode violations to prevent hold test failures. A hold test failure refers to a signal arriving too early be used which may result in losing its value. In FIG. 5, step 331, the nets based on an early mode timing criticality are ordered, and for each net containing a hold test failure, a buffer insertion is performed (step 332) for delaying the signal to meet the early mode time. Buffer insertion for early mode delay is preferably performed using the minimal perturbation method, as described above.

A form of common path pessimism removal is advantageously run after performing a block of optimizations to resynchronize the path-based processes with the incremental block based timing and optimization. The method of removing pessimism is preferably achieved using in U.S. patent application No. 20050066297A1, published Mar. 24, 2005.

Figure 6:
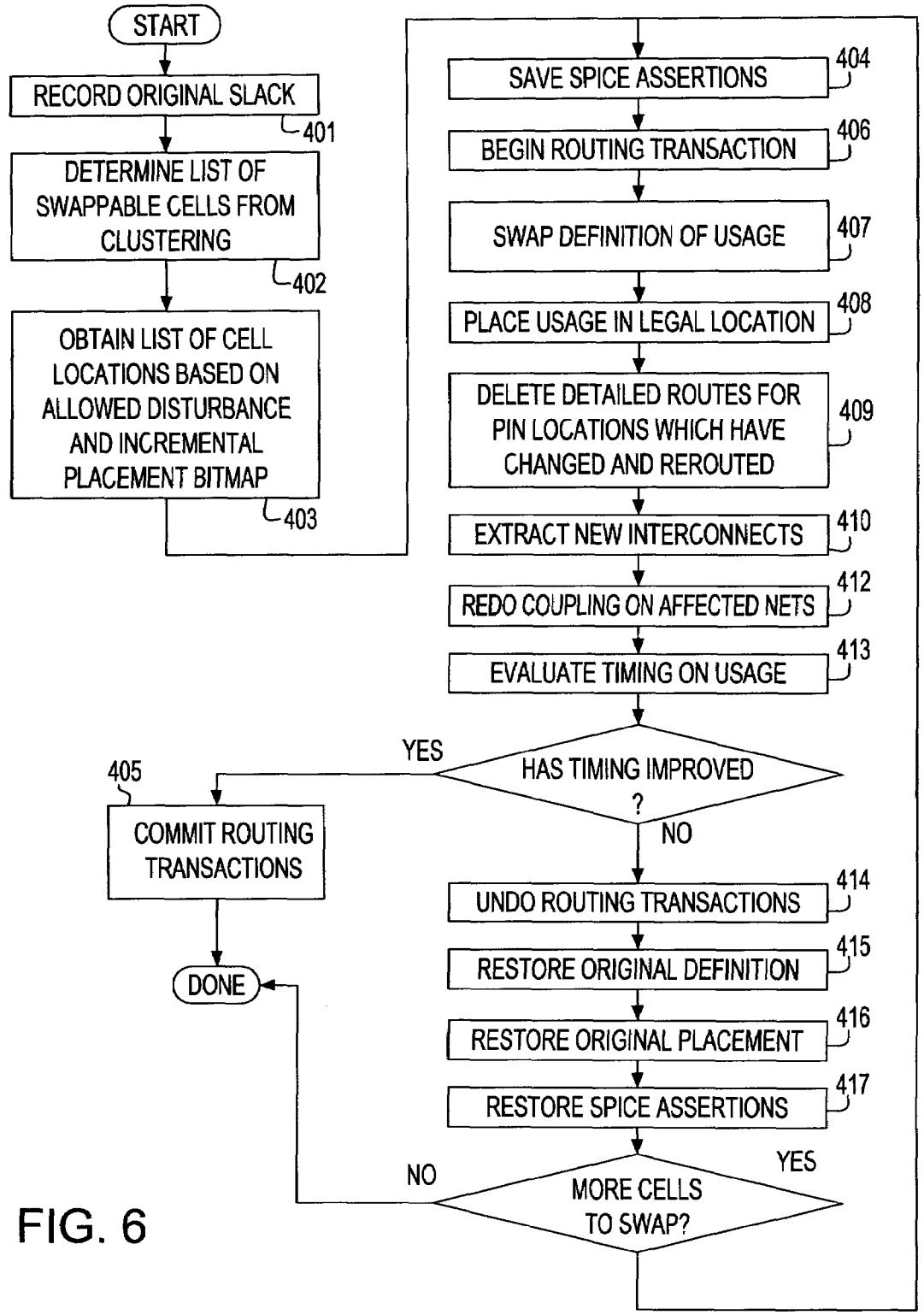
FIG. 6 describes the process of resizing a cell with minimal perturbation to solve timing violations in a minimal placement and routing.

Referring now to FIG. 6, an embodiment of the invention is shown that describes the process of resizing a cell to solve timing violations in a minimal placement and routing disruptive manner, thereby achieving minimal perturbation.

In step 401, the original slack is recorded. In step 402, using information from step 201, the list of swappable cells from the library characterization is determined. In step 403, a list of physical cell locations is obtained, based on some allowable displacement from the original physical location of the usage being resized and the incremental placement bitmap. In step 404, any SPICE assertions (parasitic information) for potential restoration are saved. In step 406, a routing transaction is initiated, which indicates that the routes and SPICE information may be altered by the transaction. Callbacks within the routing infrastructure are invoked when necessary netlist changes requires it. In step 407, the definition of the usage is changed to one of the swappable cells in the list generated in step 403. Using the nearest physical location within an allowable displacement, a new legal location in step 408 is assigned, wherein the new cell definition fits without overlap. In step 409, any detailed routes for any pin locations which have been changed are deleted, and the nets rerouted. Rerouting must first delete any conflicting routes caused by the new placement location followed by a point-to-point route in violation mode. Following detailed routes, extraction on these new routes of the net being observed is performed (step 410). Given the new parasitic extraction, one can redo the incremental coupling to adjust the timing windows, as described in U.S. patent application Ser. No. 11/420,529. After applying the coupling information to the timing graph, the timing is re-evaluated and compared to the original slack stored (step 401). If the new slack exceeds the original slack, the change is accepted, and the program branches to step 405 which commits the routing transactions in the model. If the slack does not improve, then the routing transactions are undone (step 414), in which instance, the original cell definition, the original cell location and the saved SPICE assertions, are all restored (steps 415, 416, 417). By undoing the routing transactions, all the detailed routes are thus also restored.

FIG. 7 illustrates the cell resizing wherein only input/output wires are disturbed.

Figure 7C:
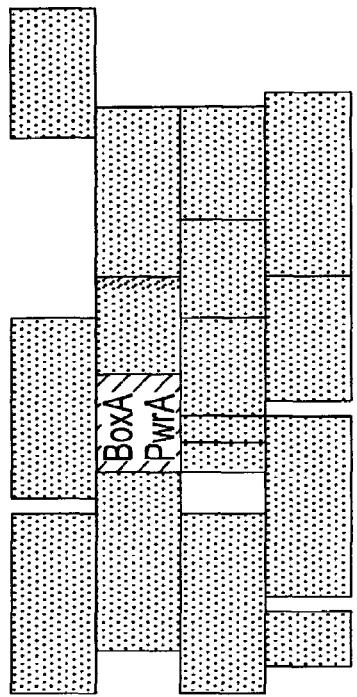
FIG. 7 illustrates the cell resizing wherein only input/output wires are disturbed.
Figure 7D:
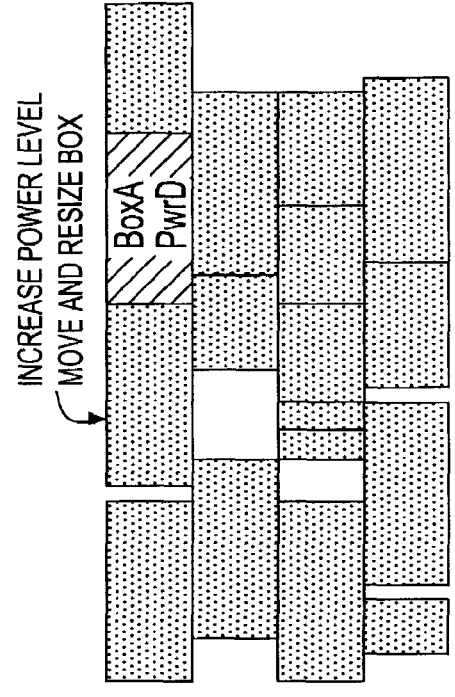
Figure 7A:
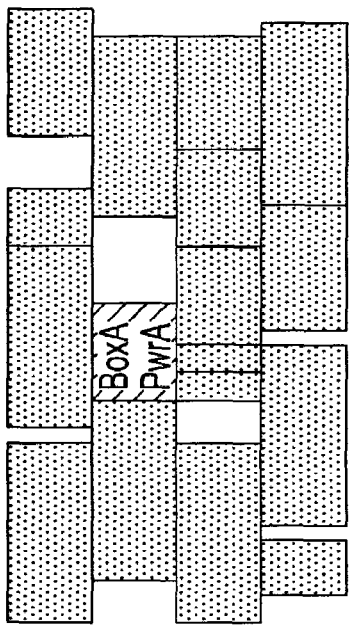
Figure 7B:
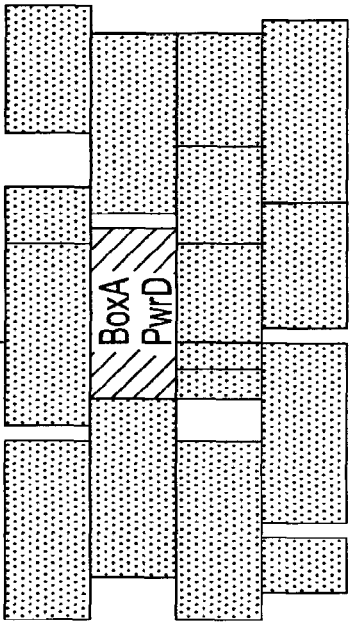

In FIG. 7a, BoxA with power level PwrA is increased to drive a wire. Space is available to its immediate right; therefore, the cell can be resized in-situ (to the right of the second row). The result is shown in FIG. 7b. In FIG. 7c, BoxA is also increased to drive a wire. However, the cell is preferably first moved to the next nearest location that accommodates the increased power level PwrD (bottom of the second row). The resulting movement is shown in FIG. 7d. This illustrates the minimal placement and wiring perturbation, since only the input/output wires of BoxA are disturbed.

Figure 8:
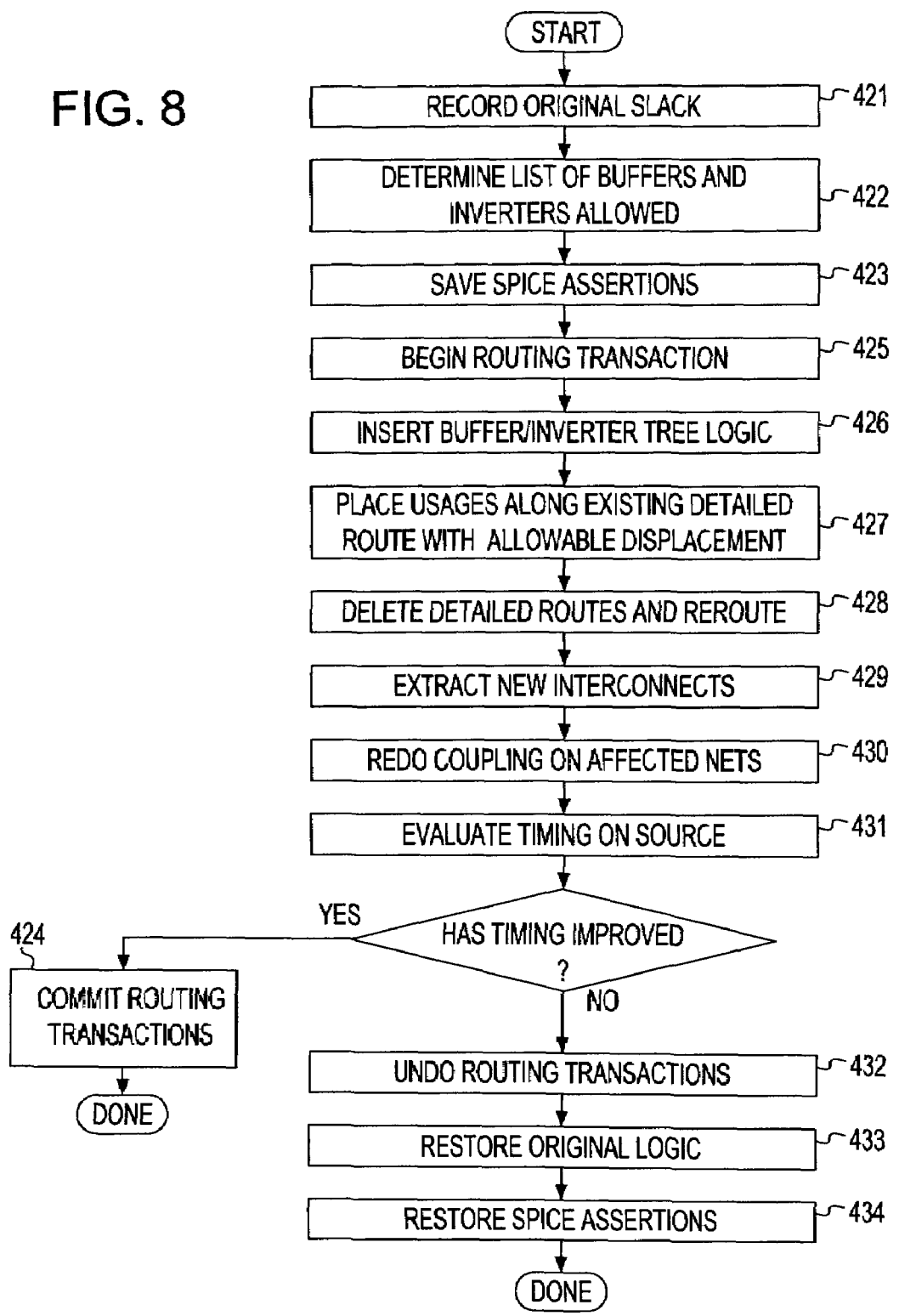
FIG. 8 illustrates the process of inserting with minimal perturbation a buffer to solve a timing violation in a minimal placement and routing.

In FIG. 8, the process of inserting buffers for either slack or electrical correction is described using the minimal perturbation method. This is similar to the method illustrated above for resizing. With few exceptions, in step 422, one determines a decision tree of buffers and inverters that are suited for insertion using the library characterization information of step 201. In step 426, buffer tree logic is inserted to correct violations. In step 433, the original net representation is restored.

It should be noted that in steps 409 and 428, the incremental rerouting is performed by a global router and point-to-point router in violation mode. Point-to-point, when in violation mode, allows performing coupled extraction. The routes are legalized periodically by the detailed router.

Shown in FIG. 9a is an example of a buffer being inserted with minimal perturbation. The wire highlighted (extending from SourceA to SinkB) is assumed to require the buffer to solve any timing violation. BufferA is advantageously inserted along the route and placed in close proximity to the route. Two new routes are created to close the open wire, leaving all other wires untouched. The result is shown in FIG. 9b.

The present invention successfully addressed problems motivated by the need for tighter integration between routing, extraction, coupling, and variation effects in the timing model to make optimization decisions. It is particularly applicable to the latest technology nodes, and successfully provides minimal disruption to the placement and routing of the netlist as this is very late in the design cycle, as well as the need to take into account variation effects (probability of criticality) on wires and circuits, in order to minimize tedious timing closure processes known to exists in the latest nodes. Finally, it also addresses the need to account for coupling when correcting paths late in the design flow.

The inclusion of incremental coupling to provide feedback, minimization of placement and routing disruptions, and inclusion of variability information, presents a unique approach that accommodates and satisfies the constraints of an integrated post-routing optimization method for design closure of sub-100 nm chips.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method for correcting violations in a placed and routed design of a chip, said design being represented by a netlist describing logical and physical characteristics of said design and by a corresponding timing graph, the method comprising:
    transforming the logical and the physical characteristics of said design minimizing disruptions to the placement and routing of the netlist;
    applying incremental timing, incremental placements and incremental routing to evaluate the transformations, and determining results of said transformations by simultaneously determining physical effects of said transformations on the timing and electrical characteristics of said design; and
    updating the timing graphs by a computer system of said design by incorporating the resulting transformations consisting of only legal placements and routing of the cells.

2. The method of claim 1, wherein said physical transformations comprise inserting new cells, increasing and decreasing physical sizes of said cells, moving said cells, tuning said threshold voltage of said cells, and orienting said cells.

3. The method as recited in claim 1 further comprising incrementally updating placement and routing models in-situ.

4. The method as recited in claim 1, wherein said violations comprise transition time, capacitance, and timing violations.

5. The method of claim 1, further comprising synchronizing path-based processes with incremental block-based timing.

6. The method as recited in claim 1, wherein local transformations supply a displacement number that returns potential locations to place candidate standard cells into unoccupied space.

7. The method as recited in claim 6, wherein a physical location within an allowable displacement assigns the legal placement in which the candidate standard cell fits without overlapping.

8. The method as recited in claim 6, wherein routing of the standard cells comprises the step of localizing and minimizing wiring congestion.

9. The method as recited in claim 1, further comprising the step of modeling interconnects by incremental extraction.

10. The method as recited in claim 1, further comprising the step of performing an incremental coupling analysis to account for noise considerations affecting timing.

11. The method as recited in claim 1, wherein said routing further comprises the step of: transacting log changes to restore said design to its original state when changes are discarded.

12. The method as recited in claim 1, wherein transforming said logical characteristics to eliminate said violations is achieved by measuring coupling effects and is followed by making changes resulting from performing an integrated coupling analysis.

13. The method as recited in claim 12, wherein said transforming of said logical characteristics takes place upon performing incremental statistical timing.

14. The method as recited in claim 13, wherein said transforming of said logical characteristics preserves SPICE parasitic data.

15. The method as recited in claim 1, wherein local transformations supply a displacement number that returns potential locations to fit candidate standard cells into occupied space, and further comprises displacing cells currently occupying the potential location to another legal location.

16. The method as recited in claim 15, wherein a physical location within an allowable displacement assigns the legal location wherein the standard cell fits without overlapping.

17. The method as recited in claim 1 further provides an abstract routing representation, including global routing to increase throughput during an early phase of design closure.

18. The method as recited in claim 1 further comprises the step of converting global routing information into detailed routing information when processing local transformations.

19. A program storage device readable by a machine, tangibly embodying a program of instructions executable by the machine to perform method steps for correcting violations in a placed and routed design of a chip, said design being represented by i) a netlist describing logical and physical characteristics of said design and ii) by a corresponding timing graph, the method steps comprising:
    transforming the logical and the physical characteristics of said design minimizing disruption to the placement and routing of the netlist;
    applying incremental timing, incremental placements and routing to evaluate the transformations, determining results of said transformations by simultaneously determining physical effects of said transformations on timing and electrical characteristics of said design; and
    updating the timing graphs of said design by incorporating the resulting transformations consisting of legal placements and routing of the cells.

* * * * *